United States Patent

[11] 3,549,972

| [72] | Inventor | John E. Callan |
| | | Milwaukee, Wis. |
| [21] | Appl. No. | 734,697 |
| [22] | Filed | June 5, 1968 |
| [45] | Patented | Dec. 22, 1970 |
| [73] | Assignee | Allen-Bradley Company |
| | | Milwaukee, Wis. |
| | | a corporation of Wisconsin |

[54] SPEED CONTROL CIRCUIT FOR A DC MOTOR
8 Claims, 1 Drawing Fig.

[52] U.S. Cl. .................................................. 318/327, 318/345
[51] Int. Cl. .................................................. H02p 5/00
[50] Field of Search .......................................... 318/327, 345, 341, 326, 332

[56] References Cited
UNITED STATES PATENTS

| 2,911,580 | 11/1959 | Gould et al. | 318/327 |
| 3,421,065 | 1/1969 | Stabile | 318/327 |
| 3,431,479 | 3/1969 | Joslyn | 318/327 |

Primary Examiner—Oris L. Rader
Assistant Examiner—K. L. Crosson
Attorney—Thomas O. Kloehn and Arthur H. Seidel ABSTRACT: A DC motor armature is energized through an SCR. A firing circuit connected to the gate of the SCR provides an AC firing signal, the potential level of which is controlled by the algebraic sum of a DC reference signal from the sliding contact of a reference potentiometer and the output of an operational amplifier. A signal generated by a tachometer driven by the armature is fed to the inverting operational amplifier along with the reference signal from the reference potentiometer, and the output is an algebraic sum of the tachometer and reference signals.

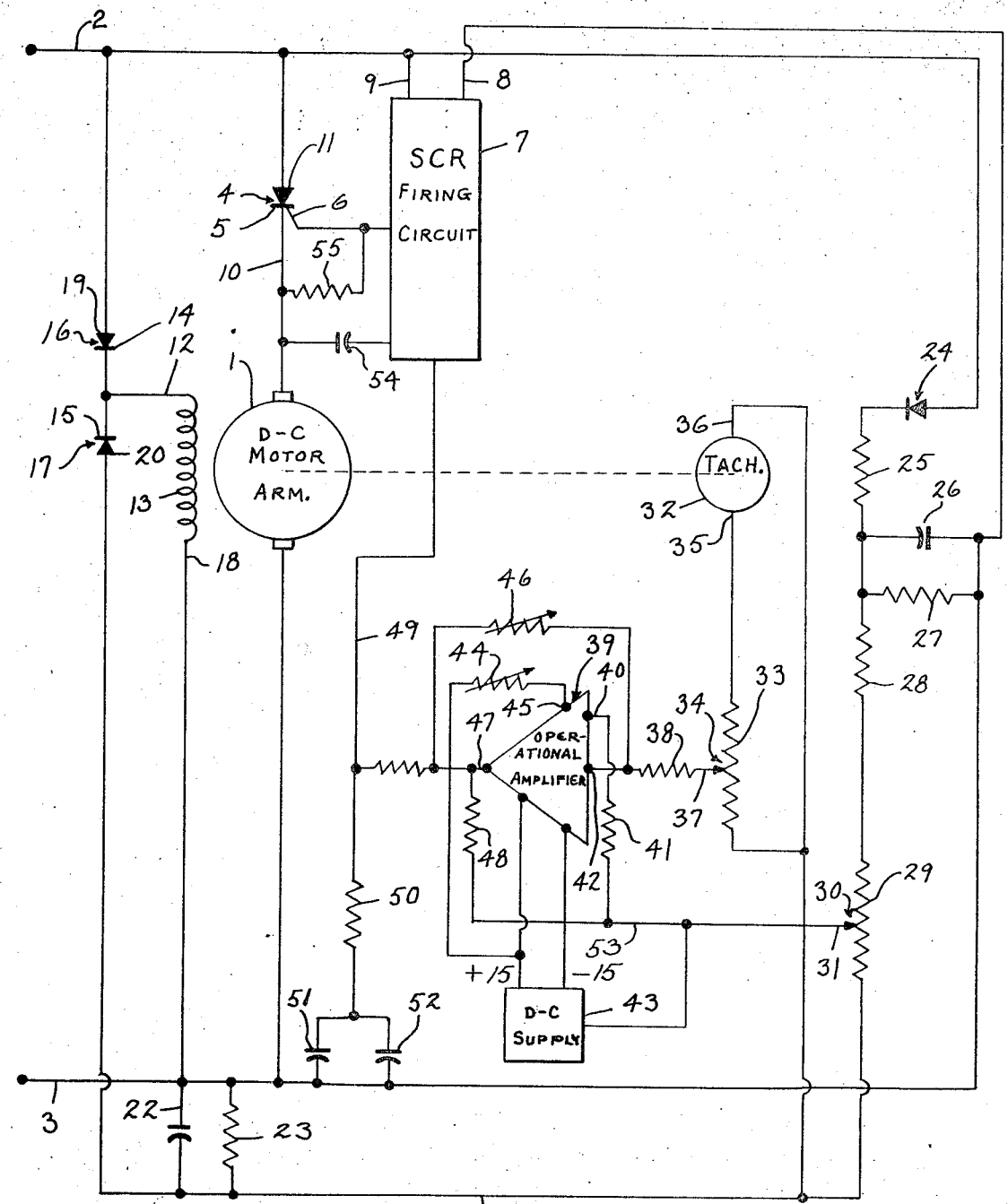

3,549,972

1

SPEED CONTROL CIRCUIT FOR A DC MOTOR

BACKGROUND OF THE INVENTION

The present invention represents a significant improvement of a conventional speed control circuit for a DC motor that is sometimes referred to as a rider-wave control circuit. The rider-wave control circuit is basically a type of phase-shift control that in the past has had extraordinary economy as its primary recommendation. This economy is achieved by comparing the induced voltage across the armature of a DC motor with a DC reference from a speed control potentiometer and using the resultant to vary the voltage level of a sinusoidal rectifier firing signal to effect what appears as a phase shift of the rectifier firing signal to the rectifier. Thus, the firing time and average conduction time of the rectifier is varied as needed to achieve a desired motor speed. The chief limitation of the use of the rider-wave type of speed control circuit has been its inherent 2 to 5 percent error.

The present invention adds to the conventional rider-wave control circuit a tachometer feedback with the result that the error is reduced to less than one percent. While rider-wave control circuits and tachometer feedback circuits had been common in the prior art as separate, individual, different types of control circuits, tachometer feedback has never been used with the rider-wave type control circuit previously. Nor has the prior art suggested any feasible way of combining these two types of control circuits compatible with the essential economy that is the primary reason for using the rider-wave type control circuit. The present invention not only provides the combination of these two different types of control circuits, but renders it commercially feasible to combine them in the simultaneous control of a direct current motor.

SUMMARY OF THE INVENTION

The present invention, therefore, relates to a speed control circuit for a DC motor; more particularly, the invention resides in a control circuit for a DC motor that is connected across an AC source in series with a controlled rectifier wherein the controlled rectifier has its control element connected to a rectifier firing circuit that is adapted to generate an alternating firing signal the potential level of which is governed by a DC control signal; a variable DC reference source provides a reference signal proportional to the desired speed of the DC motor; a tachometer mechanically coupled to the DC motor provides a DC feedback signal proportional to the actual speed of the DC motor, and a summing network is connected to receive the reference signal and the feedback signal and is adapted to transmit to the rectifier firing circuit a control signal that varies proportionally with the difference between said reference signal and said feedback signal.

The foregoing circuitry is connected to a common line with the DC motor so that the ultimate result may be described as a tachometer connected armature voltage with rider-wave control circuit. However, the summing network is connected only to the reference signal source and the feedback signal source so that it sees only the difference between those two and not the entire feedback or reference voltage level.

BRIEF DESCRIPTION OF THE DRAWINGS

The drawing is a schematic diagram of a control circuit for a DC motor embodying the present invention.

DESCRIPTION OF THE PREFERRED EMBODIMENT

In the drawing, an armature 1 of a DC motor is connected across an AC line 2 and 3 in series with a silicon-controlled rectifier 4. The silicon-controlled rectifier 4 has its cathode 5 facing the armature 1 and its anode 11 toward the AC line 2. The SCR 4 has a gate 6, which is its control element, and the gate 6 is connected to a silicon-controlled rectifier firing circuit 7. The SCR firing circuit is connected to the AC lines 2 and 3 by leads 8 and 9 and to the armature circuit line 10 by capacitor 54. The SCR firing circuit 7 may be any one of the several well-known firing circuits for silicon controlled rectifiers. The DC motor has one end 12 of its field winding 13 connected in common with cathodes 14 and 15 of diode 16 and free wheeling diode 17, respectively, and the opposite end 18 of the field winding 13 is connected to the AC line 3. The top diode 16 has its anode 19 connected to the AC line 2 and the bottom diode 17 has its anode 20 connected to a bias line 21 and through a bias capacitor 22 and bias resistor 23 to the AC line 3, which serves as a base line 3 for the entire control.

A DC reference voltage supply is produced from the AC lines 2—3 by means of a rectifier diode 24 and a filter network including a filter resistor 25, a filter capacitor 26 and a parallel filter resistor 27. The filtered DC passes through a divider resistor 28 and a resistor element 29 of a speed control potentiometer 30 to the bias line 21. The speed control potentiometer 30 has a sliding contact 31 from which a reference signal is taken. The sliding contact 31 may be considered a reference signal source 31.

A tachometer 32 is mechanically coupled to the armature 1 of the DC motor. The tachometer 32 has its negative terminal 36 connected to the bias line 21. A resistance element 33 of a feedback potentiometer 34 has one end connected to a positive terminal 35 of the tachometer 32 and its other end connected to the bias line 21. A sliding contact 37 provides a tachometer feedback signal through an input resistor 38.

A summing network for the feedback signal and the input signal is provided in an inverting operational amplifier 39, which is a commercially available circuit. The operational amplifier 39 has its positive input 40 connected through a drop resistor 41 to the sliding contact 31 of the speed control potentiometer 30, and a negative input terminal 42 of the operational amplifier 39 is connected through the feedback input resistor 38 to the sliding contact 37 of the feedback potentiometer 34. A common point 53 for the operational amplifier 39 is represented by the conductor 53, which is connected to the reference signal source 31 so that the operational amplifier will always be at the potential level of the reference signal. The operational amplifier 39 is provided with ± 15 volt DC supply 43, and a trimming pot 44 connects a balancing terminal 45 of the amplifier 39 to the positive pole of the DC supply 43. A variable feedback resistor 46 is connected between an output 47 of the inverting operational amplifier 39 and the negative input 42 to control the gain of the amplifier 39.

A control signal conductor 49 connects the SCR firing circuit 7 through a drop resistor 50 and a pair of capacitors 51 and 52 to the base line 3. The control signal conductor 49 also connects the output 47 of the inverting operational amplifier 39 to the SCR firing circuit 7 to transmit the control signal to the SCR firing circuit 7. Finally, a noise suppressor resistor 55 connects the armature circuit 10 and the gate 6 of the silicon controlled rectifier 4 to minimize the effect of any noise induced in the circuit.

The SCR firing circuit 7 is connected to the power lines 2 and 3 through the leads 8 and 9 respectively to receive a sinusoidal signal in phase with the voltage at the anode 11 of the silicon controlled rectifier 4. In the SCR firing circuit 7, the phase of this sinusoidal signal is shifted so that it will lag the voltage on the anode on the SCR 4 by 90°. Thus by raising the DC level of the sinusoidal firing signal with respect to the voltage at the cathode 5 of the SCR 4, the firing time of the SCR 4 can be advanced, and conversely by lowering the DC level of the sinusoidal firing signal relative to the level of the cathode 5 of the SCR 4, the firing time of the SCR 4 can be delayed. The SCR firing circuit 7 is adapted to receive the control signal and to cause the AC firing signal to ride on the control signal so that the potential level of the firing signal will vary with the control signal.

The DC level of the SCR firing signal, i.e., the sinusoidal signal referred to in the previous paragraph, is initially controlled by a reference voltage obtained from the reference potentiometer 30 which frequently is a speed control pot. In order to utilize armature voltage feedback, the speed pot 30 is connected at its lower end to a base line, which in embodiment shown is the bias line 21, that is on the opposite side of the armature from the cathode 5 of the SCR 4. Hence, during motor acceleration, for example, when the sliding contact 31 on the speed pot 30 is set for a desired speed, and the DC motor 1 accelerates, the potential level of the cathode 5 of the SCR 4 will also increase and approach the potential level of the sliding contact 31 on the speed pot 30, with the result that the firing time of the SCR 4 progressively retards.

In addition to the speed pot 30 and armature voltage feedback, the present invention also employs the tachometer 32, the output of which is tied to the base line 3 on the opposite side of the armature 1 from the SCR 4 through the bias line 21 in common with the bottom end of the speed pot 30. The reference voltage from the sliding contact 31 is also fed into the operational amplifier 39 along with the output from the tachometer 32. Thus it is the reference voltage as modified by the output from the operational amplifier 39 that is fed to the SCR firing circuit 7 as the variable DC level for the sinusoidal firing signal.

What the operational amplifier 39 sees is not the absolute voltage levels of the tachometer 32 feedback signal and the reference voltage from the speed pot 30, but only the difference between the two. The fact that the operational amplifier 39 sees only voltages in the range of the possible discrepancies between the tachometer output and the reference voltage can be quite significant commercially since the absolute voltage levels of the tachometer feedback and the reference voltage relative to the base line may be quite substantial and require an extremely expensive operational amplifier 39.

The operational amplifier 39 functions as an inverting summing circuit. If the DC motor is turning faster than commanded by the setting of the sliding contact 31 of the speed pot 30, the tachometer signal will be of higher potential than the reference signal from the speed pot 30 and the output from the operational amplifier 39 will be negative. However, if the motor is turning more slowly than commanded by the sliding contact 31 on the speed pot 30, the tachometer output will be lower than the reference signal from the speed pot 30, and the output of the operational amplifier 39 will be positive. Since the common point 53 of the operational amplifier 39 is connected to the sliding contact 31 on the speed pot 30, the operational amplifier 39 is always at the potential level of the sliding contact 31, and the feedback signal from the output 47 of the operational amplifier 39 either increases or reduces the potential level of that reference voltage from the speed pot 30 to the firing circuit 7. If the motor 1 is turning too fast, then the negative output from the operational amplifier 39 will reduce the potential level of the control signal to the SCR firing circuit 7. If the motor 1 is operating too slowly, then the positive output of the operational amplifier 39 will increase the DC control signal potential fed to the SCR firing circuit 7. The algebraic sum of the output from the operational amplifier 39 and the potential level of the sliding contact 31 of the speed pot 30 is fed to the SCR firing circuit 7 to provide the DC potential on which the sinusoidal firing signal rides.

The tachometer 32 output and the reference signal on the sliding contact 31 of the speed pot 30 could be connected directly to the base line 3 to which the terminal of the armature 1 of the DC motor is connected, but in the preferred embodiment the tachometer 32 output and the speed pot 30 output are connected to the base line 3 through the bias line 21. The potential level of the bias line 21 is lower than the potential level of the base line 3 by the amount of the voltage drop across the resistor 23 and the filter capacitor 22 so that the reference voltage and the tachometer feedback may be an equivalent voltage lower than the terminal of the armature 1 of the motor and than the cathode 5 of the SCR 4. This makes it possible to bring the motor 1 to a complete halt. If the reference voltage and tachometer feedback were tied directly to the base line 3, the SCR 4 would continue to fire at the lowest setting of the speed pot 30 so that the average power would be minimal and the motor 1 would creep, but by reducing the possible potential level of the sinusoidal firing signal relative to the lowest possible potential of the cathode 5 of the SCR 4 it is possible to prevent the SCR 4 from conducting any power at all to the armature 1 of the DC motor. Therefore the motor 1 will be brought to a complete halt.

It is evident from the foregoing that a circuit embodying the present invention could vary in a great many respects from that diagramed in the drawing and described in detail above, therefore the invention is not to be limited to the specific circuit disclosed here as a preferred embodiment, but rather, the invention is deemed to reside in the combination set forth in the claims that follow.

I claim:

1. A speed control circuit for a DC motor comprising the combination of;
    a controlled rectifier having a control element to render said rectifier conductive responsive to a firing signal, and being connected across an AC source in series with an armature of a DC motor;
    a firing circuit adapted to emit said firing signal having amplitude varying at the frequency of said AC source and riding on a variable potential level determined by a control signal received from an external source, said firing circuit being connected to said control element of said controlled rectifier to apply said firing signal to said control element;
    a reference signal source adapted to emit a reference signal proportional to a desired speed of said motor;
    a tachometer driven by said motor to emit a tachometer signal proportional to the speed of said motor;
    and a summing circuit connected to receive said reference signal and said tachometer signal, adapted to emit a control signal that is an algebraic sum of said reference signal plus the difference between the reference signal and said tachometer signal, and connected to transmit said control signal to said firing circuit.

2. A speed control circuit for a DC motor as set forth in claim 1 wherein;
    said reference signal source is a DC potential source connected to said armature of said DC motor across said armature from said controlled rectifier;
    and said summing circuit has a common point connected to said reference signal source to be at the DC potential of said reference signal.

3. A speed control for a DC motor as set forth in claim 2, wherein said summing circuit is an inverting summing circuit emitting an output potential such that said control signal is at the potential level of said reference signal when said motor is operating at said desired speed, said control signal is below said potential level of said reference signal when said motor is operating faster than said desired speed and said control signal is above said potential level of said reference signal when said motor is operating more slowly than said desired speed.

4. A speed control for a DC motor as set forth in claim 2 wherein said tachometer is connected with said reference signal source to a terminal of said armature of said DC motor across said armature from said controlled rectifier.

5. A speed control for a DC motor as set forth in claim 4 wherein said tachometer and said reference signal source are connected to a potential level below said terminal of said armature across said armature from said controlled rectifier.

6. A speed control for a DC motor as set forth in claim 2 wherein:
    said summing circuit is an inverting operational amplifier, having a negative input and a positive input and having a common point connected to said reference signal source;
    said tachometer is connected to said negative input;
    and said reference signal source is connected to said positive input.

7. A speed control for a DC motor as set forth in claim 1 wherein said controlled rectifier is a silicon-controlled rectifier that has an anode connected to said AC source, and a cathode connected to said armature of said DC motor, and a gate that is said control element.

8. A speed control for a DC motor as set forth in claim 7 wherein said firing circuit receives an AC signal from said AC signal source and is adapted to shift the phase of said AC signal to provide a firing signal that lags the phase of said AC source by 90°.